June 4, 1940.	R. C. CROSS	2,203,455
PISTON
Filed Oct. 4, 1938
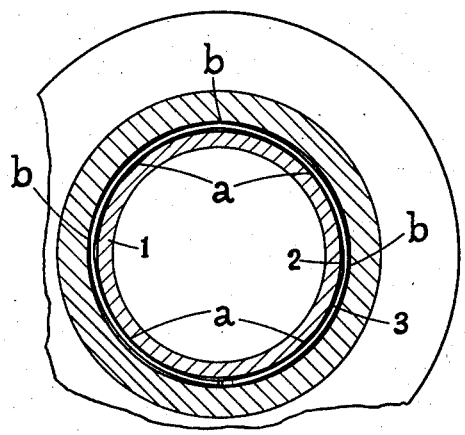
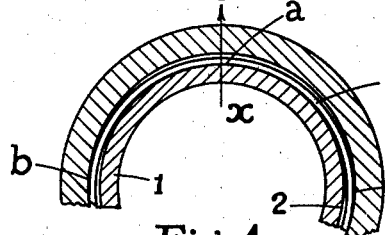
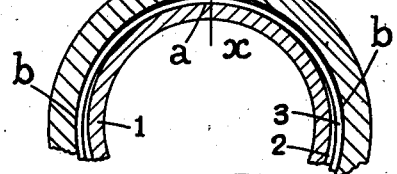
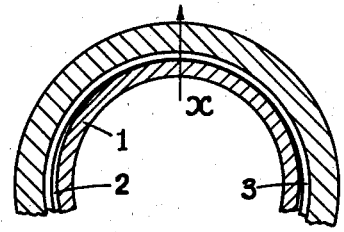
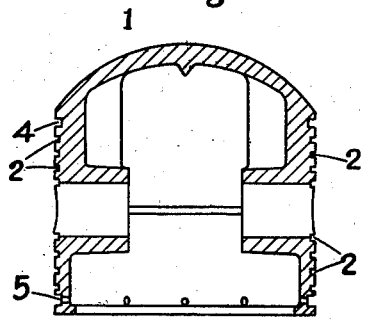
INVENTOR
ROLAND C. CROSS Patented June 4, 1940

2,203,455

UNITED STATES PATENT OFFICE 2,203,455

PISTON

Roland Claude Cross, Combe Down, England

Application October 4, 1938, Serial No. 233,276
In Great Britain October 12, 1937

1 Claim. (Cl. 309—5)

This invention relates to pistons for internal combustion engines, pumps and the like and has for its object to provide an improved piston fitted with piston rings arranged to take the bearing load of the piston and to act as cushioning members to prevent piston slap. The invention is particularly applicable to engines or machines in which both piston and cylinder are made of aluminum alloy so that some sort of bearing ring is essential to prevent the alloy piston from rubbing against the alloy cylinder. The invention may also be applied with advantage, however, to pistons working in cast iron cylinders or cylinders fitted with hard liners of such a nature that the prevention of direct rubbing contact between piston and cylinder is not ordinarily essential.

In the manufacture of pistons according to the present invention, advantage is taken of the fact that a piston ring made by winding and bending a drawn metal wire, such as upon a mandrel or otherwise, is more uniform in thickness than a piston ring made in the ordinary way by turning, grinding or other machining processes, although it is not so accurately circular as a machined ring but inevitably shows some slight departures from the circular shape.

According to this invention, these properties are utilised to prevent piston slap by providing a piston with two or more unmachined rings made by winding and bending drawn metal wire, the rings being each mounted in a groove having a radial depth smaller than the radial thickness of its ring, and being resiliently compressible therein, so that the drawn wire rings support the bearing load and further have a cushioning action due to the slight irregularities of contour of the rings due to their method of manufacture.

The invention will be more readily understood from the following description with reference to the accompanying drawing, in which—

Figure 1 is a sectional view of a piston made according to the invention but with the piston rings removed to show the grooves more clearly;

Figure 2 is a section through piston and cylinder showing the manner in which the drawn wire ring takes the bearing load, the clearance and the distortion or departure of the piston ring from true circularity being greatly exagerated for the purpose of illustration; and Figures 3, 4 and 5 are views similar to Figure 2 illustrating the anti-slap cushioning action of the rings.

The piston 1 shown in Figure 1 has a number of annular grooves 2 of rectangular cross-section machined accurately to a uniform radial depth. Each of these grooves is fitted with a piston ring (shown at 3 in Figures 2, 3, 4 and 5) whose radial thickness is made slightly greater than the radial depth of the groove 2 so that the ring takes the bearing load and prevents the piston 1 from rubbing directly against the walls of the cylinder. For an 80 mm. cylinder bore using rings of one-sixteenth inch square wire, a ring clearance of from six to ten thousandths of an inch has been found suitable (i. e., the amount by which the radial thickness of the wire exceeds the depth of groove. According to the preferred method of fitting, the piston is first fitted to the cylinder in the ordinary way as required for a piston required to bear directly against the walls of the cylinder as usual, and is then formed with grooves 2 having a radial depth exactly equal to the radial thickness of the wire rings 3. About six to ten thousandths of an inch is then skimmed off the cylindrical walls of the piston all round thus providing the ring clearance hereinbefore referred to.

As previously mentioned the uniformity of thickness of the drawn wire from which the rings 3 are made is extremely accurate. Owing to their method of formation however, the rings are not strictly circular but have irregularities or departures from the strictly circular form which are illustrated in much exaggerated form in Figures 2, 3, 4 and 5 of the drawing. Owing to these irregularities the rings bear against the bottoms of the grooves 2 at certain points as indicated at $a$ in the drawing whilst at other points they bear against the walls of the cylinder as indicated at $b$. If the piston is thrust against the wall of the cylinder in the directon of the arrow marked $x$ in Figures 3, 4 and 5, so that the piston is displaced from the concentric position shown in Figure 3 to the slightly off-set position illustrated in Figure 4 the ring 3 shown in these figures is bent and therefore offers a resilient resistance to the displacement of the piston. The wire ring 3 acts as a beam supported against the cylinder walls at the points $b$ and taking the thrust of the piston at the point $a$. As the wire ring 3 is deflected by the lateral piston thrust, the points of support $b$ move circumferentially towards the point $a$ so that the resistance to deflection is greatly increased as wil be obvious from inspection of Figures 3 and 4. In the limit, the length of wire acting as a beam would be reduced to zero and the thrust would be transmitted directly through the thickness of the ring 3 as illustrated in Figure 5. The wire ring shown in Figures 3, 4 and 5 will thus resist the piston displacement just described and will tend to restore the piston to its central position. The wire will thus act as a cushion to absorb the thrust momentum and to minimise or prevent piston slap. It will be obvious that, provided a sufficient number of rings 3 are provided, the irregularities of these rings will provide for a cushioning action similar to that just described in any radial direction, the several rings co-operating to hold the piston in a central position and to prevent direct bearing of any part of the piston wall against the cylinder under any normal working conditions.

In order to secure a balanced cushioning action, the wire rings 3 are distributed on either side of the gudgeon pin, the number of rings 3 between the gudgeon pin and the head of the piston being preferably equal to the number between the gudgeon pin and the end of the skirt.

The piston shown in Figure 1 has grooves 2 to receive four wire rings 3 above the gudgeon and four below the gudgeon and two of these grooves are positioned so that they break into the gudgeon pin hole as shown. When only two rings such as 3 are employed, it would be advantageous to locate one above and one below the gudgeon, but it is preferred to employ two or more rings 3 on each side of the gudgeon.

The head of the piston is provided with a further groove 4 to receive a ring (not shown) which may be a floating cast iron piston ring of ordinary construction conventionally designed to form a gas and oil seal. More than one ordinary ring may be used to suitable locations. A groove 5 to receive a scraper ring is also provided in the skirt of the piston.

In the production of the rings 3, the first step consists in drawing a wire of the required section. This wire is then bent into a circular form such as by winding on a cylindrical mandrel of suitable diameter to form the rings. The variation from true circularity resulting from this method of manufacturing piston rings provides the degree of irregularity necessary for the purpose of the invention. Single rings may be formed on the mandrel of lengths of wire cut to size, or a wire may be helically wound and the resulting helical spring-like element may be split with a cut to form a plurality of rings in one operation. The rings thus formed may be subjected to heat treatment, such as mild annealing, hardening or tempering. Steel particularly suited for nitriding may be used and the nitriding process may be effected while the wire is still on the mandrel.

I claim:

Anti-slap piston means, comprising, a piston having a plurality of separate annular grooves, a plurality of separate compressible packing rings each having free end portions and formed of drawn spring steel wire sections bent into annular non-circular shape, said rings when seated in the grooves of the piston, having the portions which are not true arcs of a circle in relatively non-registering relation vertically of the piston face to engage the cylinder at angularly spaced points, said grooves being of a radial depth smaller than the radial thickness of the rings whereby the rings are caused to take the bearing load of the piston in the cylinder.

ROLAND CLAUDE CROSS.